UNITED STATES PATENT OFFICE.

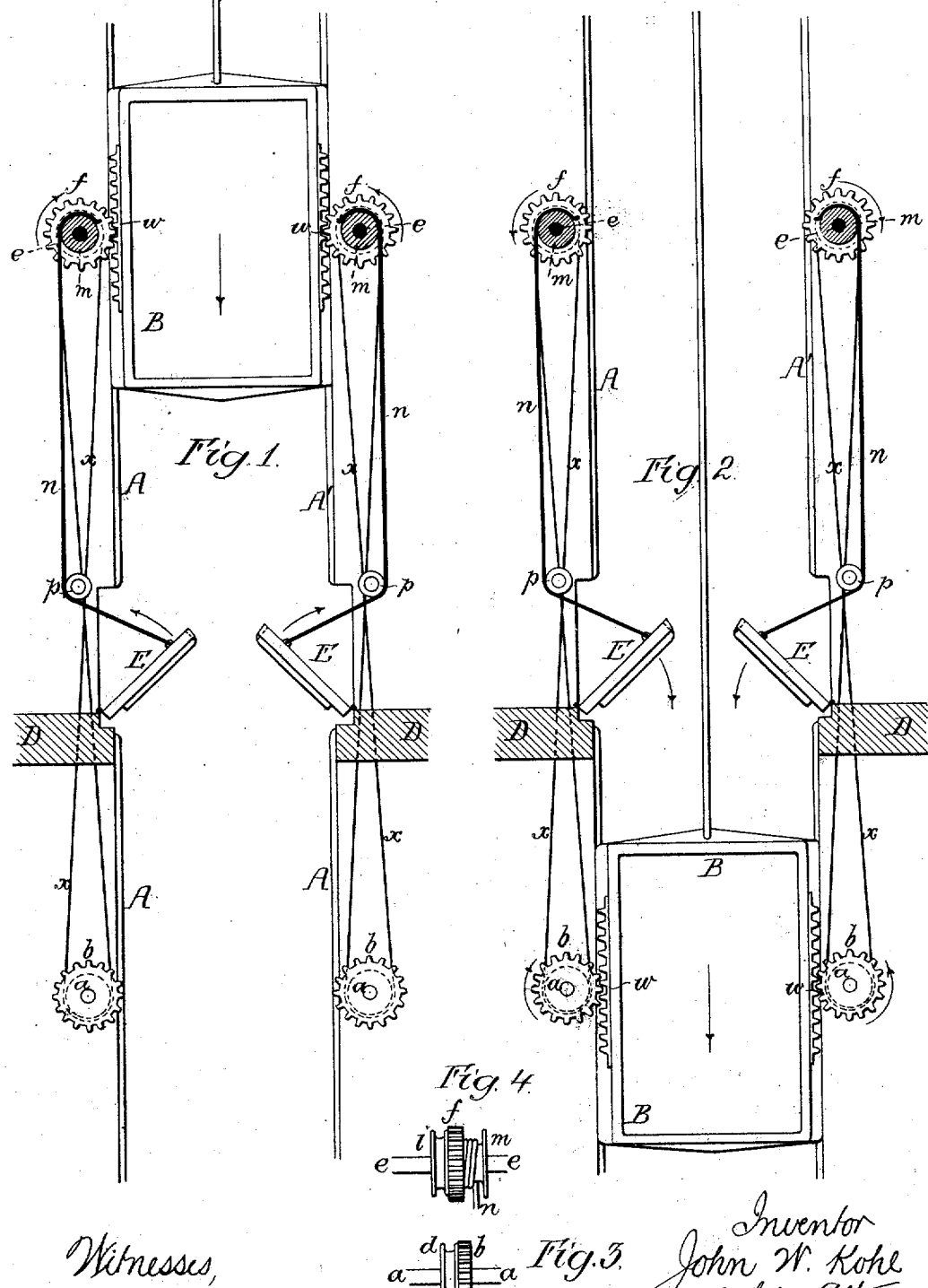

JOHN W. KOHL, OF PHILADELPHIA, PENNSYLVANIA, ASSIGNOR TO HIMSELF, CHARLES R. KOHL, AND WILLIAM S. KOHL, OF SAME PLACE.

IMPROVEMENT IN HATCH-CLOSERS.

Specification forming part of Letters Patent No. 222,285, dated December 2, 1879; application filed May 8, 1879.

*To all whom it may concern:*

Be it known that I, JOHN W. KOHL, of Philadelphia, Pennsylvania, have invented a new and useful Improvement in Automatic Hatch-Closers, of which the following is a specification.

The object of my invention is to construct simple and effective mechanism for automatically opening and closing hatchway-covers as the cage ascends or descends.

This object I attain in the following manner, reference being had to the accompanying drawings, in which—

Figure 1 is a view of an elevator well and cage with my improvements; Fig. 2, the same with the cage in a different position; and Figs. 3 and 4, detached views of parts of the device.

A A' represent the opposite posts or frames of the elevator-well; B, the elevator-cage; D, one of the floors of the building; and E E, doors for closing the hatchway, these doors being hinged at their outer edges to the floor D, and meeting in the center of the well, the inner edge of each door being recessed, so as to form an opening for the passage of the hoisting-rope when the cage is below the doors.

To bearings on each of the posts A A', at some distance below the floor D, is adapted a shaft, $a$, each of these shafts carrying a pinion, $b$, and sheave-wheel $d$, firmly secured together and capable of turning on or with the shaft. Fig. 4 shows a side view of one of the shafts $a$.

To the bearings on the posts A A' above the floor D are adapted shafts $e$, each of which carries a pinion, $f$, a sheave-wheel, $i$, and a drum, $m$, all of which are secured together so as to turn in unison on or with the shaft $e$. Fig. 3 is a side view of one of the shafts $e$.

To each of the drums $m$ is secured the upper end of a rope, $n$, which passes round a pulley, $p$, on the post, and is secured at its lower end to one of the hatchway-doors E.

Each of the side frames of the cage B carries a rack, $w$, so located that it will, on the ascent and descent of the cage, engage with and turn the pinions $b$ and $f$ on that side of the elevator-well.

The sheave-wheel $d$ of the lower shaft, $a$, and the sheave-wheel $i$ of the upper shaft, $e$, on each side of the well, are connected by a crossed belt, $x$, so that when motion in one direction is imparted to either of the shafts $a$ or $e$ the other shaft will turn in a contrary direction.

The operation of the device when the cage is descending is as follows: The racks $w$ engage with the teeth of the pinions $f$, and cause the same and the shafts $e$ to turn in the directions of the arrows, Fig. 1, the drums $m$ winding up the cords $n$ and elevating the doors E, which have assumed an almost vertical position by the time the bottom of the cage is in line with the upper edges of the doors. After the cage has passed through the hatch, the racks $w$ engage with the pinions $b$, and cause the turning of the same and the shafts $a$ in the direction of the arrows, Fig. 2. This movement is transmitted by means of the belts $x$ to the shafts $e$, which turn in directions contrary to the shafts $a$, and thus cause the drums $m$ to unwind the ropes $n$ and lower the doors E.

On an upward movement of the cage the above-described operations are reversed, as will be readily understood.

The belts $x$ and ropes $n$ are preferably made of wire, in order to prevent any material shrinkage or expansion of these parts by atmospheric changes.

The doors E when fully raised should incline slightly toward each other, or should be so weighted that they will commence to fall as soon as the ropes $n$ are slackened, the tension of the belts $x$ preventing the accidental falling of the doors, so that the latter are under the direct control of the cage.

When but one hatchway-door is used instead of two, the above-described operating devices need be used on one side of the well only.

Instead of crossing the belts $x$, the racks $w$ may be caused to act on the pinions $f$ through the medium of intermediate pinions, so that the shafts $a$ and $e$ will be turned in reverse directions as the cage ascends or descends. The crossed belts are preferred, however, on account of their simplicity and economy.

I claim as my invention—

The combination of each of the closing doors of a hatchway with an automatic raising and lowering device, consisting of a rack, $w$, on the cage, a shaft, $a$, below the floor, carrying a pinion, $b$, and sheave-wheel or pulley $d$, a shaft, $e$, above the floor, carrying a pinion, $f$, sheave-wheel or pulley $i$, and drum $m$, a belt, $x$, connecting said sheave-wheels or pulleys, and a rope, $n$, wound round the drum at its upper end, and connected at its lower end to said closing door, all substantially as specified.

In testimony whereof I have signed my name to this specification in the presence of two subscribing witnesses.

JOHN W. KOHL.

Witnesses:
    WILLIAM J. COOPER,
    HARRY SMITH.